(12) United States Patent
Bull et al.

(10) Patent No.: US 11,720,945 B2
(45) Date of Patent: Aug. 8, 2023

(54) CUSTOMIZATION AND REPRODUCTION OF AVATAR ON A PHYSICAL ITEM

(71) Applicant: GREENPARK SPORTS, INC., Burlingame, CA (US)

(72) Inventors: Tim Bull, Belmont, CA (US); Nick Swinmurn, Hillsborough, CA (US); Chad Hurley, Atherton, CA (US); Ken Martin, Oak Park, CA (US)

(73) Assignee: GREENPARK SPORTS, INC., Burlingame, CA (US)

( * ) Notice: Subject to any disclaimer, the term of this patent is extended or adjusted under 35 U.S.C. 154(b) by 0 days.

(21) Appl. No.: 17/022,514

(22) Filed: Sep. 16, 2020

(65) Prior Publication Data

US 2021/0082018 A1 Mar. 18, 2021

Related U.S. Application Data

(60) Provisional application No. 62/901,712, filed on Sep. 17, 2019.

(51) Int. Cl.
| | | |
|---|---|---|
| *G06Q 30/0601* | (2023.01) | |
| *G06Q 20/12* | (2012.01) | |
| *G06Q 50/04* | (2012.01) | |
| *A63F 13/69* | (2014.01) | |

(52) U.S. Cl.
CPC ......... *G06Q 30/0621* (2013.01); *A63F 13/69* (2014.09); *G06Q 20/1235* (2013.01); *G06Q 30/0633* (2013.01); *G06Q 30/0643* (2013.01); *G06Q 50/04* (2013.01); *A63F 2300/5553* (2013.01); *A63F 2300/609* (2013.01)

(58) Field of Classification Search
None
See application file for complete search history.

(56) References Cited

U.S. PATENT DOCUMENTS

| | | | |
|---|---|---|---|
| 2012/0130846 A1* | 5/2012 | Alivandi | G06Q 30/02 705/26.5 |
| 2013/0080287 A1* | 3/2013 | Currie | G06Q 30/0621 705/26.5 |
| 2014/0113720 A1* | 4/2014 | Borge | A63F 13/00 463/31 |
| 2016/0144283 A1* | 5/2016 | Martin | A63F 9/16 463/29 |
| 2016/0236093 A1* | 8/2016 | Yano | A63F 13/61 |
| 2017/0080346 A1* | 3/2017 | Abbas | A63F 13/79 |

OTHER PUBLICATIONS

ISA/US—Notification of and International Search Report and Written Opinion for related International Application No. PCT/US2020/051043 dated Jan. 5, 2021; 16 pgs.

* cited by examiner

*Primary Examiner* — Jason T Yen
(74) *Attorney, Agent, or Firm* — Loeb & Loeb LLP

(57) ABSTRACT

Methods, systems, and storage media for customization and reproduction of an avatar are disclosed. Exemplary implementations may: select at least one original asset comprising at least an avatar comprising a virtual representation of a user-controlled character; customize an appearance of the avatar to provide a customized avatar; and produce the customized avatar on a physical item through either a 2D or 3D process.

18 Claims, 7 Drawing Sheets

CUSTOMIZATION AND REPRODUCTION OF AVATAR ON A PHYSICAL ITEM

CROSS-REFERENCE TO RELATED APPLICATION

This present application claims the benefit of priority under 35 U.S.C. § 119(e) to U.S. Provisional Application No. 62/901,712, filed Sep. 17, 2019, the disclosure of which is hereby incorporated by reference in its entirety for all purposes.

TECHNICAL FIELD

The present disclosure generally relates to video games, and more particularly to methods, systems, and storage media for customization and reproduction of an avatar, for example, on a physical item.

BACKGROUND

Computer games conventionally have provided for virtual representations of a user within a game world through the use of avatars. Users invest time, money, and effort in selecting and customizing their avatars by adjusting parameters to control facial features, achieving game objectives to unlock items that can be applied to a character, purchasing skins (e.g., graphics that can be applied to an entire item or character), and modifying the clothing that their virtual characters are wearing.

BRIEF SUMMARY

One aspect of the present disclosure relates to a method for customization and reproduction of an avatar. The method may include selecting at least one original asset including at least an avatar including a virtual representation of a user-controlled character. The method may include customizing an appearance of the avatar. The method may include producing the avatar on a physical item through either a 2D or 3D process.

In some implementations of the method, it may include modelling, during a pre-production phase, the original asset in 3D. In some implementations of the method, the original asset may include at least one of a base avatar, clothing, or skins.

In some implementations of the method, it may include rendering the original asset to low quality 3D models or 2D slices of 3D models.

In some implementations of the method, it may include associating metadata with the original asset. In some implementations of the method, the metadata may include at least one of a base file, a type of gear, or rules of unlocking the original asset.

In some implementations of the method, it may include unlocking avatars through at least one of gameplay, purchase, or a levelling mechanism.

In some implementations of the method, it may include collecting copies of gear for personalizing the avatar.

In some implementations of the method, the customizing may further include changing, during a customization phase, features of the avatar.

In some implementations of the method, the producing may further include triggering an order process for recreating the avatar on the physical item.

In some implementations of the method, the 2D process may include rendering the avatar to a 2D image. In some implementations of the method, the 2D process may include printing the 2D image to the physical item including at least one of a mug, a poster, or clothing.

In some implementations of the method, the 3D process may include rendering the avatar as a 3D printed object on a base.

Another aspect of the present disclosure relates to a system configured for customization and reproduction of an avatar. The system may include one or more hardware processors configured by machine-readable instructions. The processor(s) may be configured to select at least one original asset including at least an avatar including a virtual representation of a user-controlled character. The processor(s) may be configured to customize an appearance of the avatar. The processor(s) may be configured to produce the avatar on a physical item through either a 2D or 3D process.

Yet another aspect of the present disclosure relates to a non-transient computer-readable storage medium having instructions embodied thereon, the instructions being executable by one or more processors to perform a method for customization and reproduction of an avatar. The method may include selecting at least one original asset including at least an avatar including a virtual representation of a user-controlled character. The method may include customizing an appearance of the avatar. The method may include producing the avatar on a physical item through either a 2D or 3D process.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
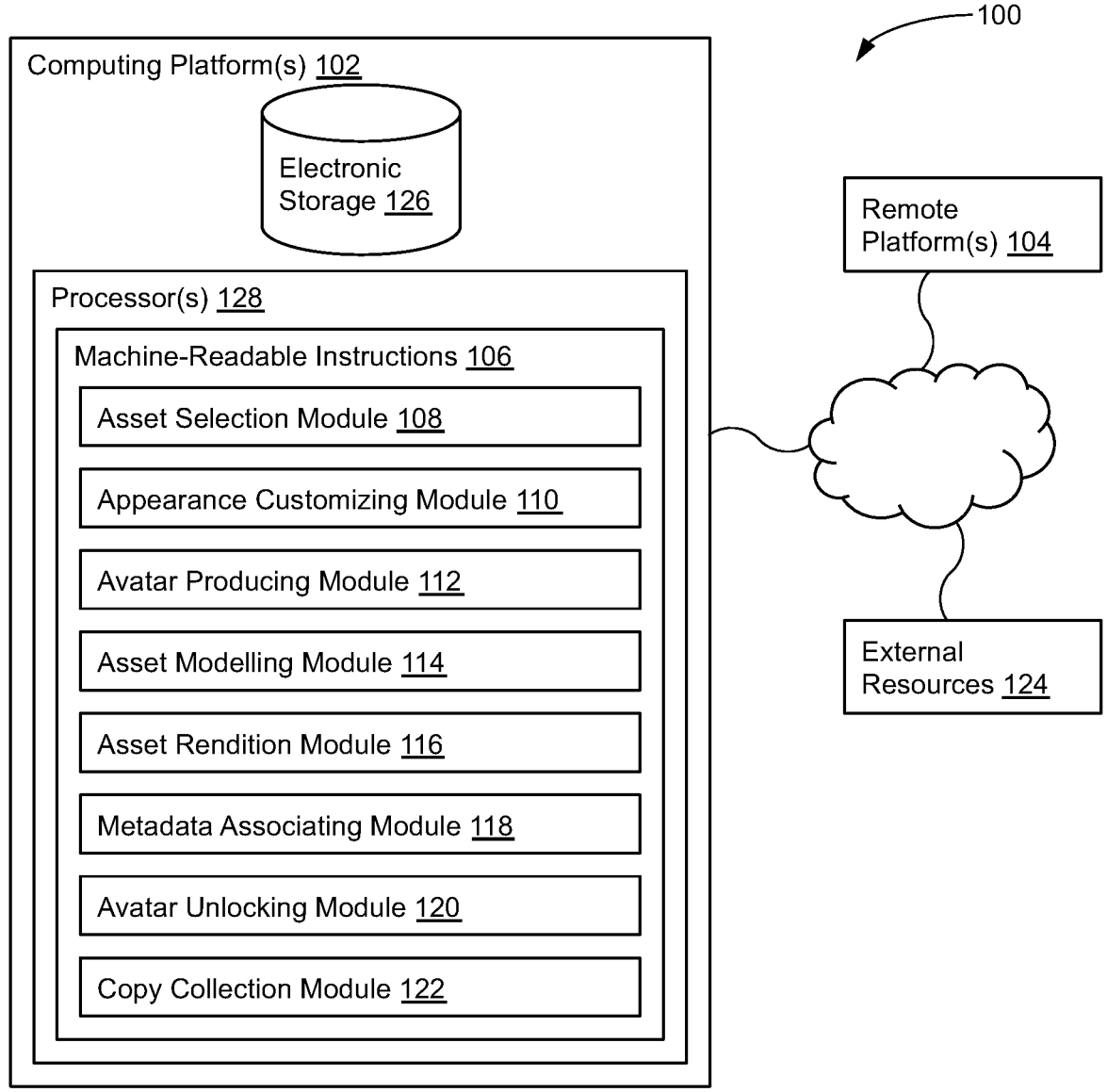
FIG. 1 illustrates a system configured for customization and reproduction of an avatar, according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

An avatar is typically a user-controlled character whose appearance may be modified by the user for them to express and represent themselves. Computer games conventionally have provided for virtual representations of a user within a game world through the use of avatars. Users invest time, money, and effort in selecting and customizing their avatars by adjusting parameters to control facial features, achieving game objectives to unlock items that can be applied to a character, purchasing skins (e.g., graphics that can be applied to an entire item or character), and modifying the clothing that their virtual characters are wearing.

Aspects of the present disclosure provide for a system that allows a user to modify their player avatar and represent it in the physical world. It is desirable to enable users within the context of a game to request the printing and delivering of the avatar that they have already invested time and money into creating for delivery as a physical item.

According to an aspect, a pre-production phase may include modelling original assets in 3D. For example, original assets are modelled in 3D, including the base avatar, the clothing, skins and other items that an end user (e.g., user) can use to customize their avatar. Original assets may be rendered to lower quality 3D models, or to 2D slices of the 3D model as individual assets. The assets may be included in a virtual store within the games services. The assets may also designate metadata to indicate their base file, what sort of gear it is, the rules for unlocking and making the gear available to a user, etc. As gear is unlocked through gameplay, purchase or other levelling mechanism, the user collects copies (e.g., links to the rendered files) of the gear that they can use to personalize their avatar.

According to an aspect, a customization phase may include unlocking gear and customizing an avatar. For example, having unlocked gear, a user can customize their avatar with the gear that they have unlocked. They may also be able to customize the avatar with other generalized features (e.g., changing the shape of the face for example) that are available to all users. Once the avatar is customized to the user's satisfaction, they can choose to "Recreate" the avatar. For example, the user may toggle a button that triggers an order process. During the order process, the end user is able to select various 2D or 3D mechanisms of reproducing the avatar in a physical way. For 2D, the avatar may be rendered to an image in a standard format like JPEG or PNG. This 2D image may then be: printed on a mug, printed on a poster, printed on a T-shirt or other item of clothing, etc. For 3D, the avatar may be rendered as a 3D printed object on a base, as a collectable mini-figure.

According to an aspect, a production phase may include producing a 2D or 3D item. For example, 2D print production may include rendering an image in PNG or JPEG by the game engine directly and processed by any printing solution capable of importing and printing images on an object. This may utilize either a Direct To Garment (DTG) type ink printer, or printed as a Heat Transfer and heat applied to the item.

According to aspects, 3D production may include user customizations (e.g., what gear is selected etc.) that may be referenced from the customization phase described above. The 3D model may then be automatically re-created as a 3D modelling software package via a script that combines the original source models into the customized 3D model. The 3D model can then be positioned and rendered with a display base (e.g., a stable base that the 3D model is inserted into at a base so that it can be displayed when printed) or any other 3D construct via a second script. A third script can then be executed to automatically export the reconstructed 3D model in a production ready 3D printing format, for example OBJ format, which supports both 3D model and color reproduction, or STL format if a single color 3D model is desired.

FIG. 1 illustrates a system 100 configured for customization and reproduction of an avatar, according to certain aspects of the disclosure. In some implementations, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction modules. The instruction modules may include computer program modules. The instruction modules may include one or more of asset selection module 108, appearance customizing module 110, avatar producing module 112, asset modelling module 114, asset rendition module 116, metadata associating module 118, avatar unlocking module 120, copy collection module 122, and/or other instruction modules.

Asset selection module 108 may be configured to select at least one original asset including at least an avatar including a virtual representation of a user-controlled character. The at least one original asset may be selected via a user selection. The at least one original asset may be selected via an automated process. By way of non-limiting example, the at least one original asset may be available or selected based on one or more of a user preference, a user setting, a user ranking, a game stage, a user contact, another user associated with the user, or a random selection. The user-controlled character may be selected from among a plurality of available characters. The virtual representation may be a predefined representation. The virtual representation may be a default representation.

Appearance customizing module 110 may be configured to customize an appearance of the avatar to provide a customized avatar. The customizing may further include changing, during a customization phase, features of the avatar. Customizing the appearance of the avatar may include changing one or more features of the avatar. A given feature of the avatar may include a visual aspect of the avatar. By way of non-limiting example, a given feature of the avatar may include one or more of a color of a part of the avatar, a shape of a part of the avatar, a clothing item worn by the avatar, an accessory held by or worn by the avatar, a tool or weapon used by the avatar, an animation of a part of the avatar, a behavior of the avatar, or a characteristic reaction of the avatar. For example, a frame from an animation of the avatar (e.g., a pose) may be selected for customization and/or reproduction.

Avatar producing module 112 may be configured to produce the customized avatar on a physical item through either a 2D or 3D process. The physical item may include a 2D physical item or a 3D physical item. The producing may further include triggering an order process for recreating the avatar on the physical item. The order process may include one or both of a purchase of the physical item or production of the physical item. In some implementations, by way of non-limiting example, triggering the order process may be enabled or unlocked by at least one of gameplay, purchase, or a levelling mechanism.

In some implementations, the 2D process may include rendering the avatar to a 2D image. By way of non-limiting example, the 2D process may include printing the 2D image to the physical item including at least one of a mug, a poster, or clothing. The 2D physical item may embody a 2D representation of the customized avatar. The 3D physical item may embody a 3D representation of the customized avatar. In some implementations, the 3D process may include rendering the avatar as a 3D printed object on a base. In some implementations, the base may be attached or attaches to a part of the 3D printed object. In some implementations, the base may allow the 3D printed object to be freestanding.

Asset modelling module 114 may be configured to model, during a pre-production phase, the original asset in 3D. By way of non-limiting example, the original asset may include at least one of a base avatar, clothing, or skins. A base avatar may include a starting point for later modeling. The clothing may be worn by or depicted as being worn by the original asset. The skins may include an original appearance of the original asset.

Asset rendition module 116 may be configured to render the original asset to low quality 3D models or low quality 2D slices of 3D models. The low quality 3D models may be physical models. The 2D slices of 3D models may be physical models. The low quality 3D models or 2D slices of 3D models may be made of a physical material. By way of non-limiting example, the physical material may include one or more of a polymer, a metal, or an alloy. A given low quality 3D model or low quality 2D slice of a 3D model may include a model having course dimensions of the original asset but not a finished appearance. Rendering the original asset may include a manufacturing process. By way of non-limiting example, the manufacturing process may include one or more of molding, an additive process or a subtractive process. Molding may include using a mold to form a model. The additive process may include 3D printing. The subtractive process may include cutting or grinding.

Metadata associating module 118 may be configured to associate metadata with the original asset. By way of non-limiting example, the metadata may include at least one of a base file, a type of gear, or rules of unlocking the original asset.

Avatar unlocking module 120 may be configured to unlock avatars through at least one of gameplay, purchase, or a levelling mechanism.

Copy collection module 122 may be configured to collect copies of gear for personalizing the avatar. A given copy of gear may include one or more virtual items associated with the avatar.

In some implementations, computing platform(s) 102, remote platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 124 may be operatively linked via some other communication media.

A given remote platform 104 may include one or more processors configured to execute computer program modules. The computer program modules may be configured to enable an expert or user associated with the given remote platform 104 to interface with system 100 and/or external resources 124, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Computing platform(s) 102 may include electronic storage 126, one or more processors 128, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 126 may comprise non-transitory storage media that electronically stores information. The electronic storage media of electronic storage 126 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from computing platform(s) 102, information received from remote platform(s) 104, and/or other information that enables computing platform(s) 102 to function as described herein.

Processor(s) 128 may be configured to provide information processing capabilities in computing platform(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute modules 108, 110, 112, 114, 116, 118, 120, and/or 122, and/or other modules. Processor(s) 128 may be configured to execute modules 108, 110, 112, 114, 116, 118, 120, and/or 122, and/or other modules by software; hardware; firmware; some combination of software, hardware, and/or firmware; and/or other mechanisms for configuring processing capabilities on processor(s) 128. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, and/or 122 are illustrated in FIG. 1 as being implemented within a single processing unit, in implementations in which processor(s) 128 includes multiple processing units, one or more of modules 108, 110, 112, 114, 116, 118, 120, and/or 122 may be implemented remotely from the other modules. The description of the functionality provided by the different modules 108, 110, 112, 114, 116, 118, 120, and/or 122 described below is for illustrative purposes, and is not intended to be limiting, as any of modules 108, 110, 112, 114, 116, 118, 120, and/or 122 may provide more or less functionality than is described. For example, one or more of modules 108, 110, 112, 114, 116, 118, 120, and/or 122 may be eliminated, and some or all of its functionality may be provided by other ones of modules 108, 110, 112, 114, 116, 118, 120, and/or 122. As another example, processor(s) 128 may be configured to execute one or more additional modules that may perform some or all of the functionality attributed below to one of modules 108, 110, 112, 114, 116, 118, 120, and/or 122.

FIGS. 2A, 2B, 2C, 2D, 2E, and/or 2F an example flow diagram (e.g., process 200) for customization and reproduction of an avatar, according to certain aspects of the disclosure. For explanatory purposes, the example process 200 is described herein with reference to FIG. 1. Further for explanatory purposes, the steps of the example process 200 are described herein as occurring in serial, or linearly. However, multiple instances of the example process 200 may occur in parallel. For purposes of explanation of the subject technology, the process 200 will be discussed in reference to FIG. 1.

Figure 2A:
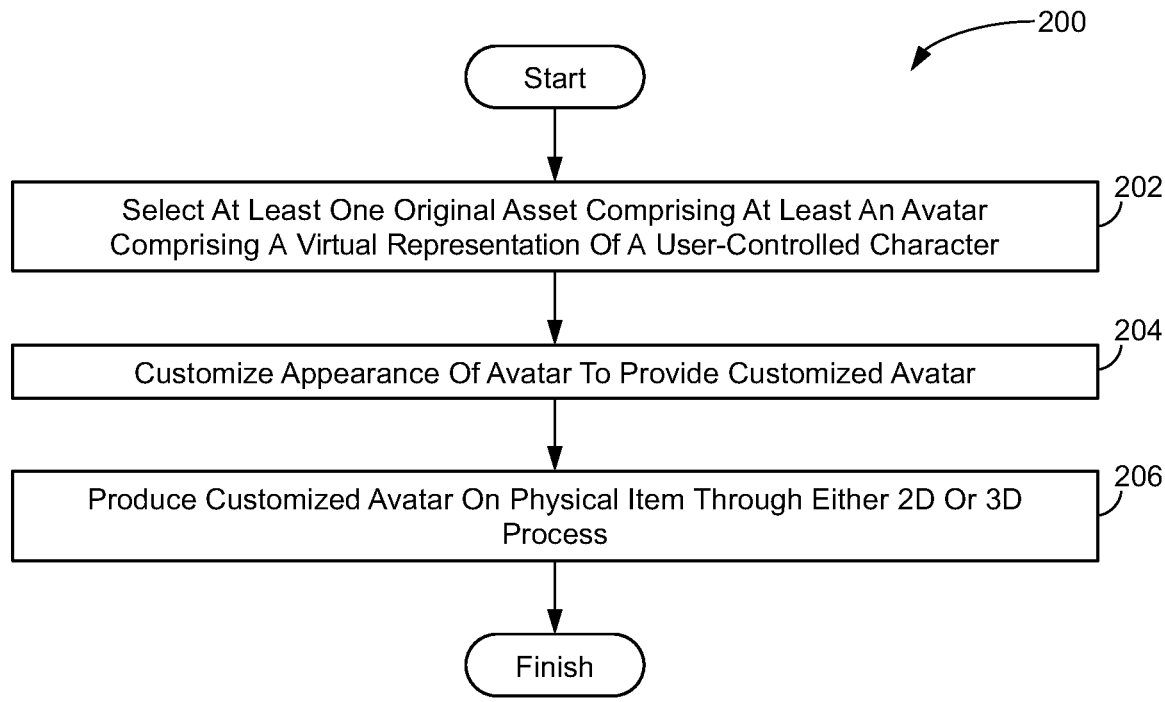
FIGS. 2A, 2B, 2C, 2D, 2E, and/or 2F illustrate an example flow diagram for customization and reproduction of an avatar, according to certain aspects of the disclosure.

FIG. 2A illustrates process 200, in accordance with one or more implementations.

At step 202, the process 200 may include selecting at least one original asset including at least an avatar including a virtual representation of a user-controlled character. The at least one original asset may be selected via a user selection. The at least one original asset may be selected via an automated process. The at least one original asset may be available or selected based on one or more of a user preference, a user setting, a user ranking, a game stage, a user contact, another user associated with the user, or a random selection. The user-controlled character may be selected from among a plurality of available characters. The virtual representation may be a predefined representation. The virtual representation may be a default representation. Step 202 may be performed by one or more hardware processors configured by machine-readable instructions including a module that is the same as or similar to asset selection module 108, according to certain aspects of the disclosure.

At step 204, the process 200 may include customizing an appearance of the avatar to provide a customized avatar. Customizing the appearance of the avatar may include changing one or more features of the avatar. A given feature of the avatar may include a visual aspect of the avatar. A given feature of the avatar may include one or more of a color of a part of the avatar, a shape of a part of the avatar, a clothing item worn by the avatar, an accessory held by or worn by the avatar, a tool or weapon used by the avatar, an animation of a part of the avatar (e.g., a pose of the avatar selected from a frame of animation of the avatar), a behavior of the avatar, or a characteristic reaction of the avatar. Step 204 may be performed by one or more hardware processors configured by machine-readable instructions including a module that is the same as or similar to appearance customizing module 110, according to certain aspects of the disclosure.

At step 206, the process 200 may include producing the customized avatar on a physical item through either a 2D or 3D process. The physical item may include a 2D physical item or a 3D physical item. The 2D physical item may embody a 2D representation of the customized avatar. The 3D physical item may embody a 3D representation of the customized avatar. Step 206 may be performed by one or more hardware processors configured by machine-readable instructions including a module that is the same as or similar to avatar producing module 112, according to certain aspects of the disclosure.

Figure 2B:
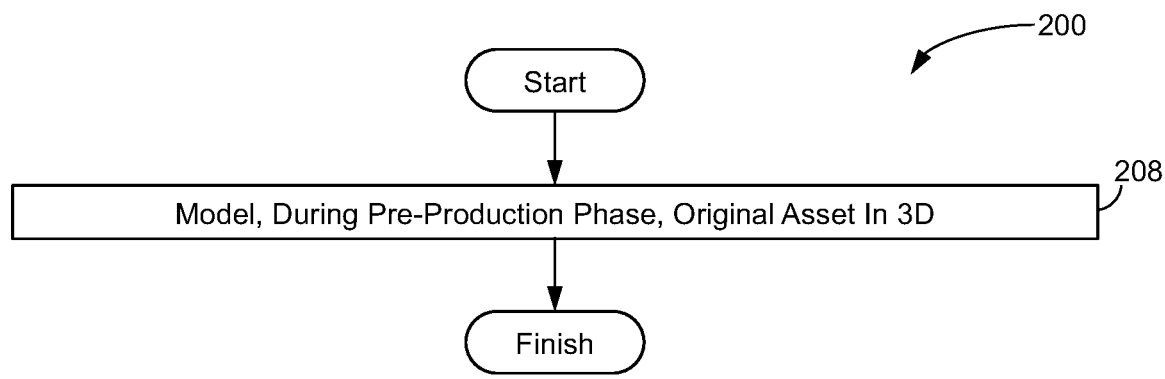

FIG. 2B illustrates process 200, in accordance with one or more implementations.

At step 208, the process 200 may include modelling, during a pre-production phase, the original asset in 3D. The original asset may include at least one of a base avatar, clothing, or skins. A base avatar may include a starting point for later modeling. The clothing may be worn by or depicted as being worn by the original asset. The skins may include an original appearance of the original asset. Step 208 may be performed by one or more hardware processors configured by machine-readable instructions including a module that is the same as or similar to asset modelling module 114, according to certain aspects of the disclosure.

Figure 2C:
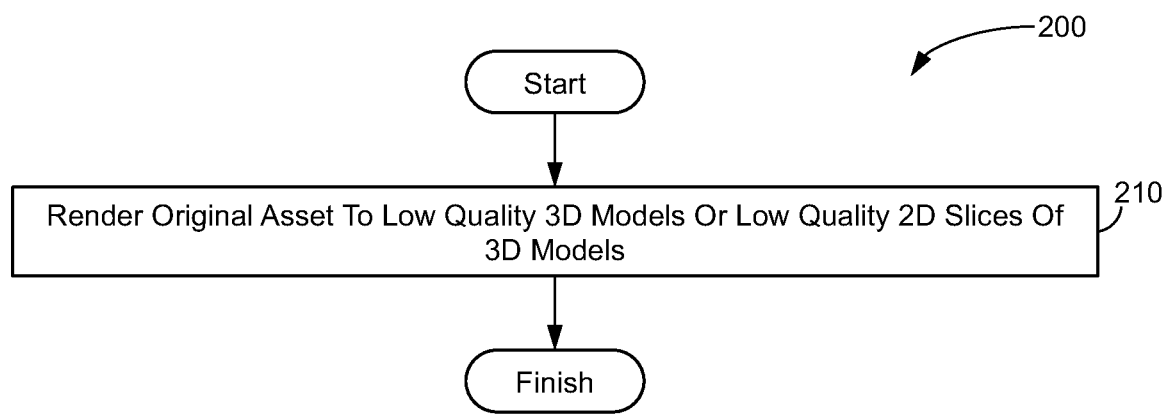

FIG. 2C illustrates process 200, in accordance with one or more implementations.

At step 210, the process 200 may include rendering the original asset to low quality 3D models or low quality 2D slices of 3D models. The low quality 3D models may be physical models. The 2D slices of 3D models may be physical models. The low quality 3D models or 2D slices of 3D models may be made of a physical material. The physical material may include one or more of a polymer, a metal, or an alloy. A given low quality 3D model or low quality 2D slice of a 3D model may include a model having course dimensions of the original asset but not a finished appearance. Rendering the original asset may include a manufacturing process. The manufacturing process may include one or more of molding, an additive process or a subtractive process. Molding may include using a mold to form a model. The additive process may include 3D printing. The subtractive process may include cutting or grinding. Step 210 may be performed by one or more hardware processors configured by machine-readable instructions including a module that is the same as or similar to asset rendition module 116, according to certain aspects of the disclosure.

Figure 2D:
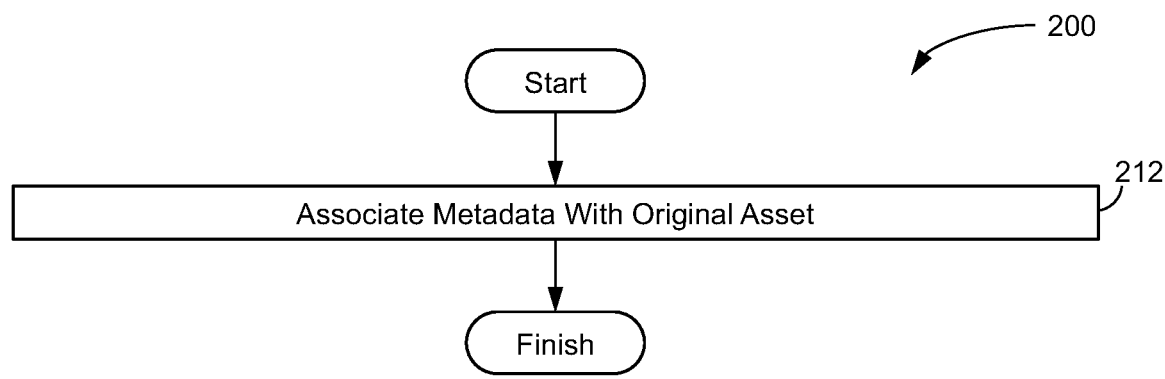

FIG. 2D illustrates process 200, in accordance with one or more implementations.

At step 212, the process 200 may include associating metadata with the original asset. The metadata may include at least one of a base file, a type of gear, or rules of unlocking the original asset. Step 212 may be performed by one or more hardware processors configured by machine-readable instructions including a module that is the same as or similar to metadata associating module 118, according to certain aspects of the disclosure.

Figure 2E:
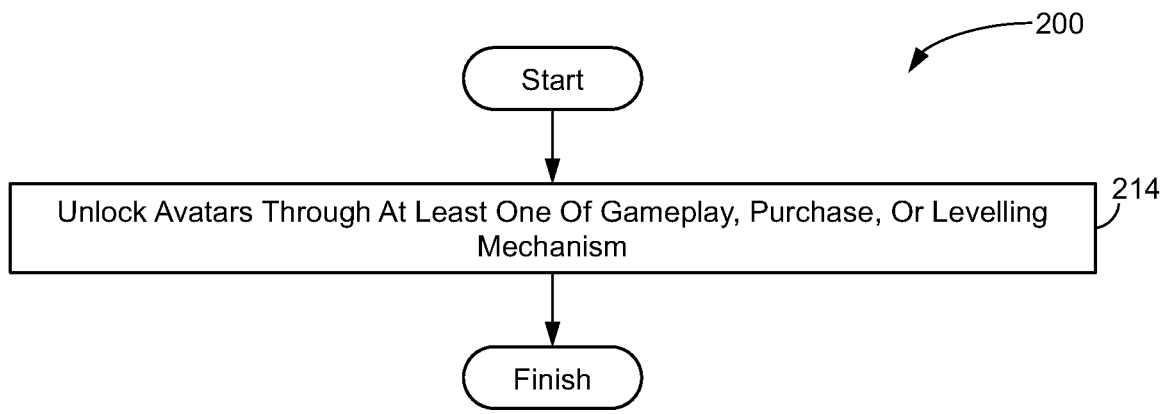

FIG. 2E illustrates process 200, in accordance with one or more implementations.

At step 214, the process 200 may include unlocking avatars through at least one of gameplay, purchase, or a levelling mechanism. Step 214 may be performed by one or more hardware processors configured by machine-readable instructions including a module that is the same as or similar to avatar unlocking module 120, according to certain aspects of the disclosure.

Figure 2F:
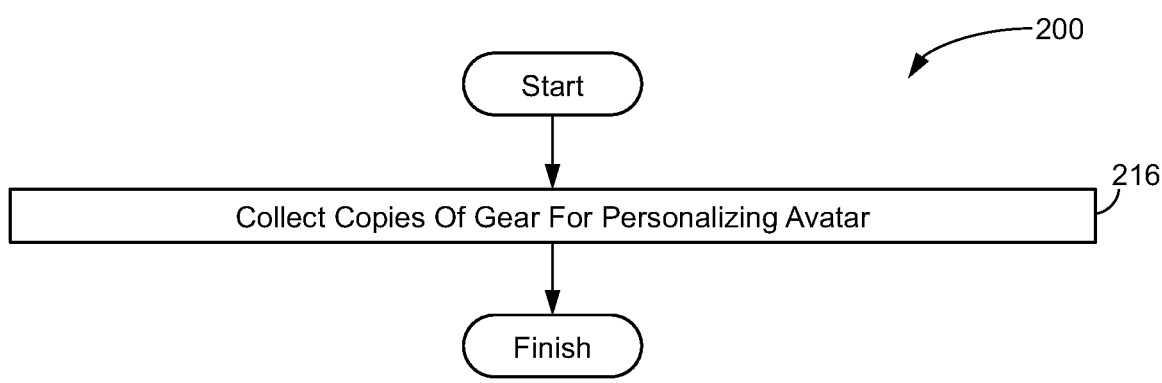

FIG. 2F illustrates process 200, in accordance with one or more implementations.

At step 216, the process 200 may include collecting copies of gear for personalizing the avatar. A given copy of gear may include one or more virtual items associated with the avatar. Step 216 may be performed by one or more hardware processors configured by machine-readable instructions including a module that is the same as or similar to copy collection module 122, according to certain aspects of the disclosure.

Figure 3:
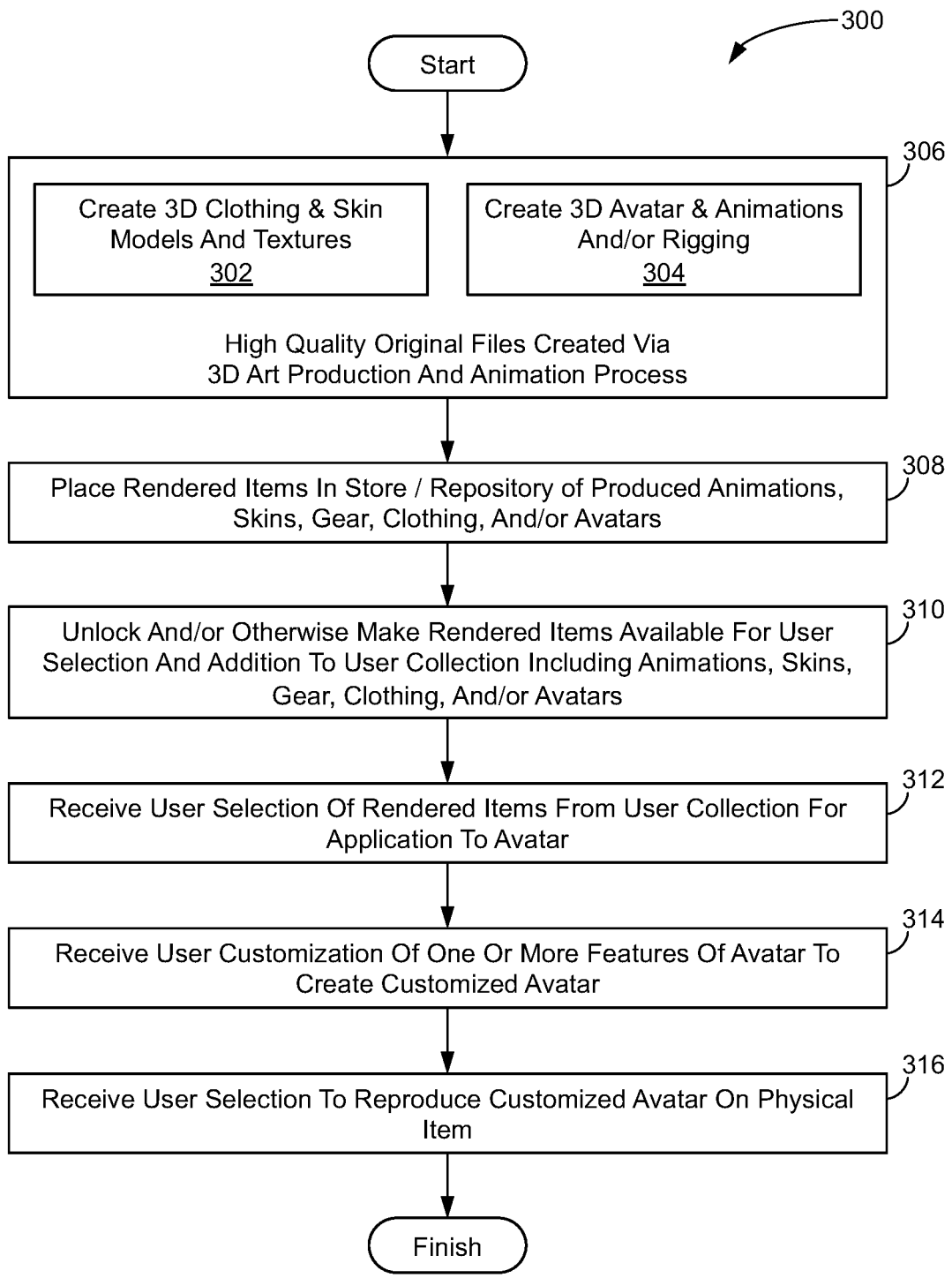
FIG. 3 illustrates an example flow diagram for customizing and reproducing an avatar on a physical item, according to certain aspects of the disclosure.

FIG. 3 illustrates an example flow diagram (e.g., process 300) for customizing and reproducing an avatar on a physical item, according to certain aspects of the disclosure. For explanatory purposes, the steps of the example process 300 are described herein as occurring in serial, or linearly. However, multiple instances of the example process 300 may occur in parallel. In some implementations, one or more steps of process 300 may be examples or sub-steps of one or more steps of process 200 described in connection with FIG. 2.

The process 300 may include creation of 3D clothing and skin models and textures (e.g., step 302). Such 3D clothing and skin models and textures may be created by artists and/or may be computer generated. The process may also include creation of 3D avatar models and animations and/or rigging (e.g., step 304). Such 3D avatars and animations and/or rigging may be created by artists and/or animators and/or may be computer generated. The process may also include 3D art production and animation of high quality original files (e.g., step 306). The original files may define original assets including one or more avatars.

According to an aspect, the items rendered (e.g., either reduced in quality or made into 2D) may be placed into a store (e.g., virtual store) (e.g., step 308). A user (e.g., end user) may unlock items by earning them in-game either through gameplay or direct purchase (e.g., step 310). The collection of skins, gear, clothing, and avatars that have been unlocked may be available to use within the game (e.g., a subset of the full store of items). The user may select produced animations, skins, gear, clothing, and avatars through the store/repository.

Figure 4A:
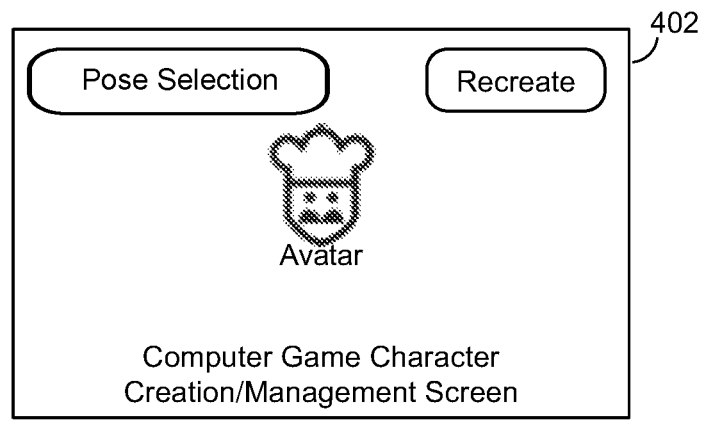
FIGS. 4A and/or 4B illustrate examples of a user interface configured for customization, reproduction, and/or ordering of an avatar, according to certain aspects of the disclosure.

According to an aspect, the user may select an item from their collection to be applied to an avatar (e.g., step 312). The user selection may be received via a game character creation/management screen or user interface (see, e.g., 402 in FIG. 4A). For example, the user may modify the avatar in-game by changing its skin, changing its outfit/clothing items, changing its color, adjusting its dimensions, and/or selecting/setting a pose (e.g., step 314). The user modification may be received via a game character creation/management screen or user interface (see, e.g., 402 in FIG. 4A). The character creation/management screen may be configured such that the user may toggle a button to recreate the avatar. For example, the button may be made available to the user through an inventory management screen, on a character creation screen, or in a photo mode screen within a game. The button may trigger a process to create an order for the user to reproduce their customized character avatar in real-life. The user may also select a pose for the avatar. For example, the pose may be selected from a frame from an animation of the avatar (see, e.g., 402 in FIG. 4A).

Figure 4B:
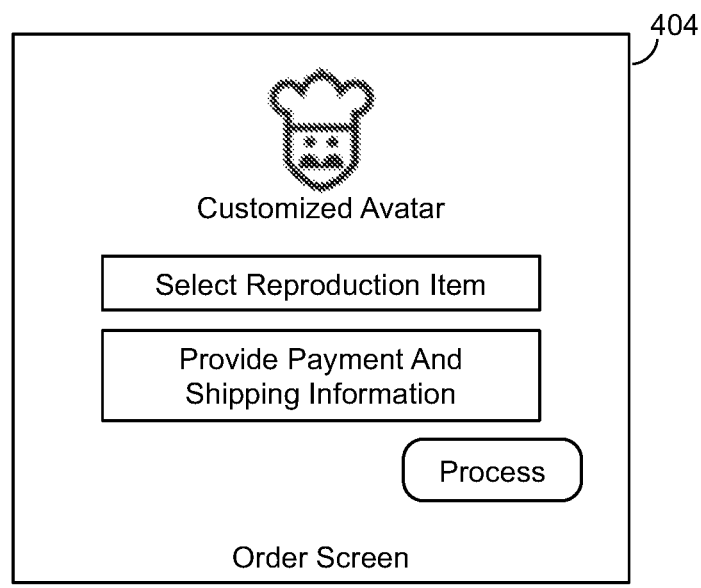

According to an aspect, the user customized avatar may be selected to be reproduced on an item (e.g., a mug, t-shirt, 3D model, etc.) (e.g., step 316). Payment may be collected, including payment information, billing information, shipping address, etc. The order may be processed through an order screen (see, e.g., 404 in FIG. 4B). For example, for 2D, the customized avatar may be generated as an image file for 2D outputs. For 3D, elements of the user customizations may be deconstructed and recreated in a 3D model from an original high quality source item (e.g., a data file). A final model may be generated at an appropriate quality for the output and the file representing the 3D object may be sent to production (e.g., a 3D printer).

Figure 5:
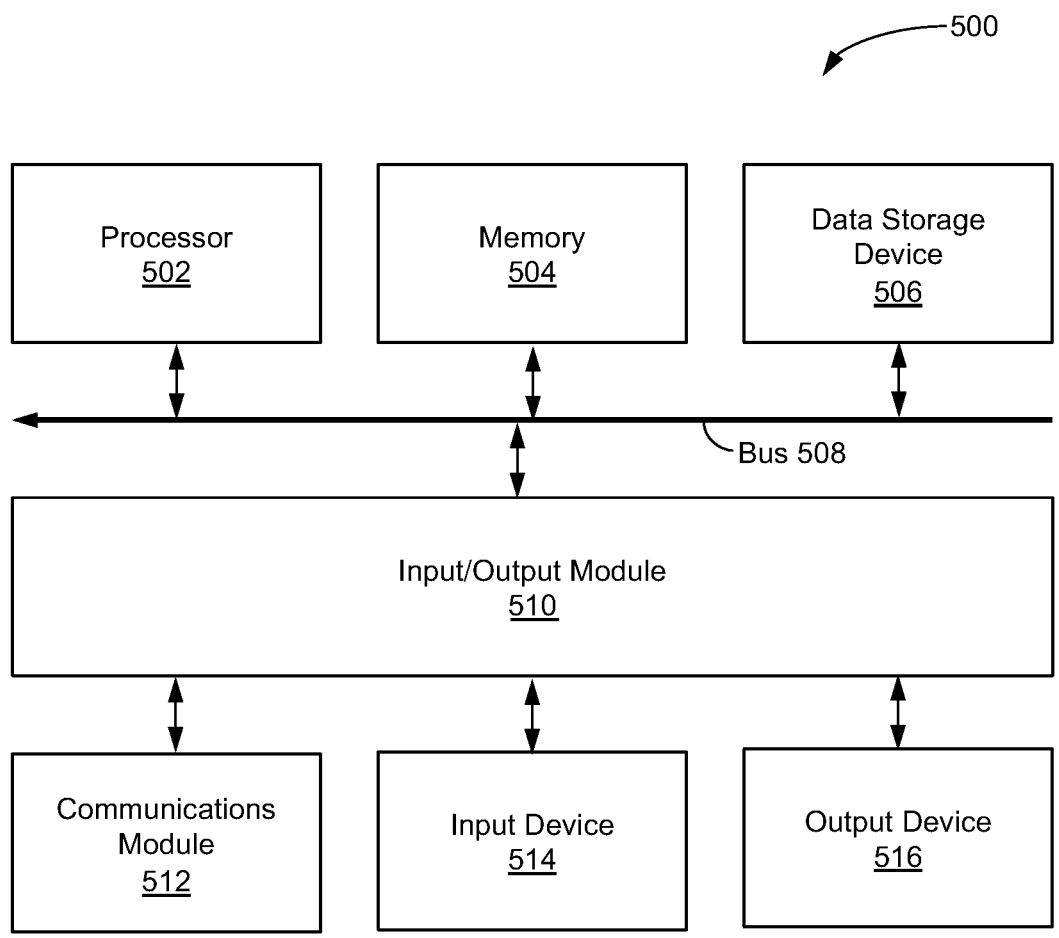
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as a LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network the bus 508, or the data storage device 506 may be read and loaded into the memory 504. Although data is described as being found in the memory 504, it will be understood that data does not have to be stored in the memory 504 and may be stored in other memory accessible to the processor 502 or distributed among several media, such as the data storage device 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for customization and reproduction of an avatar, comprising:
   selecting at least one original asset corresponding to at least one avatar, wherein the at least one avatar includes a virtual representation of a user-controlled character;
   accessing rules of unlocking the at least one original asset;
   in response to a levelling mechanism matching one or more of the rules of unlocking the at least one original asset, the levelling mechanism corresponding to the user-controlled character:
      unlocking a gear asset for the avatar, and
      automatically linking metadata for the gear asset to the avatar,
      wherein the levelling mechanism includes at least one of gameplay and purchase, and;
   in response to receiving a selection of the gear asset:
      customizing an appearance of the avatar with the gear asset, and
      producing the avatar on a physical item through either a 2D process or a 3D process.

2. The computer-implemented method of claim 1, further comprising:
   modelling, during a pre-production phase, the at least one original asset in 3D, the at least one original asset comprising at least one of a base avatar, clothing, or skins.

3. The computer-implemented method of claim 1, further comprising:
   rendering the at least one original asset to low quality 3D models or 2D slices of 3D models.

4. The computer-implemented method of claim 1, further comprising:
   associating metadata with the at least one original asset, the metadata comprising at least one of a base file, a type of gear asset, or the rules of unlocking the at least one original asset.

5. The computer-implemented method of claim 1, further comprising:
   collecting copies of further gear assets for personalizing the avatar.

6. The computer-implemented method of claim 1, wherein the customizing further comprises changing, during a customization phase, features of the avatar.

7. The computer-implemented method of claim 1, wherein the producing further comprises triggering an order process for recreating the avatar on the physical item.

8. The computer-implemented method of claim 1, wherein the 2D process comprises rendering the avatar to a 2D image; and
   wherein the 2D process comprises printing the 2D image to the physical item comprising at least one of a mug, a poster, or clothing.

9. The computer-implemented method of claim 1, wherein the 3D process comprises rendering the avatar as a 3D printed object on a base.

10. A system configured for customization and reproduction of an avatar, the system comprising one or more hardware processors configured by machine-readable instructions to:
- select at least one original corresponding to at least one avatar, wherein the at least one avatar includes a virtual representation of a user-controlled character;
- access rules of unlocking the at least one original asset;
- in response to a levelling mechanism matching one or more of the rules of unlocking the at least one original asset, the levelling mechanism corresponding to the user-controlled character:
  - unlock a gear asset for the avatar, and
  - automatically link metadata for the gear asset to the avatar,
  - wherein the levelling mechanism includes at least one of gameplay and purchase, and;
- in response to receiving a selection of the gear asset:
  - customize an appearance of the avatar with the gear asset; and
  - produce the avatar on a physical item through either a 2D process or a 3D process.

11. The system of claim 10, wherein the one or more hardware processors are further configured by machine-readable instructions to:
- model, during a pre-production phase, the original asset in 3D, the original asset comprising at least one of a base avatar, clothing, or skins.

12. The system of claim 10, wherein the one or more hardware processors are further configured by machine-readable instructions to:
- render the original asset to low quality 3D models or 2D slices of 3D models.

13. The system of claim 10, wherein the one or more hardware processors are further configured by machine-readable instructions to:
- associate metadata with the original asset, the metadata comprising at least one of a base file, a type of gear asset, or the rules of unlocking the original asset.

14. The system of claim 10, wherein the one or more hardware processors are further configured by machine-readable instructions to:
- collect copies of further gear assets for personalizing the avatar.

15. The system of claim 10, wherein the customizing further comprises changing, during a customization phase, features of the avatar.

16. The system of claim 10, wherein the producing further comprises triggering an order process for recreating the avatar on the physical item.

17. The system of claim 10, wherein the 2D process comprises rendering the avatar to a 2D image;
- wherein the 2D process comprises printing the 2D image to the physical item comprising at least one of a mug, a poster, or clothing; and
- wherein the 3D process comprises rendering the avatar as a 3D printed object on a base.

18. A non-transient computer-readable storage medium having instructions embodied thereon, the instructions being executable by one or more processors to perform a method for customization and reproduction of an avatar, the method comprising:
- selecting at least one original asset corresponding to at least one avatar, wherein the at least one avatar comprising a virtual representation of a user-controlled character;
- accessing rules of unlocking the at least one original asset;
- in response to a levelling mechanism matching one or more of the rules of unlocking the at least one original asset, the levelling mechanism corresponding to the user-controlled character:
  - unlocking a gear asset for the avatar, and
  - automatically linking metadata for the gear asset to the avatar,
  - wherein the levelling mechanism includes at least one of gameplay and purchase, and;
- in response to receiving a selection of the gear asset:
  - customizing an appearance of the avatar with the gear asset, and
  - producing the avatar on a physical item through either a 2D process or a 3D process.

* * * * *